United States Patent [19]
Roberts

[11] Patent Number: 5,746,453
[45] Date of Patent: May 5, 1998

[54] HIGH TEMPERATURE INLINE EXPANSION JOINT

[75] Inventor: Allen L. Roberts, Shawnee, Okla.

[73] Assignee: ERC Industries, Inc., Houston, Tex.

[21] Appl. No.: 664,715

[22] Filed: Jun. 17, 1996

[51] Int. Cl.[6] ................................................. F16L 21/02
[52] U.S. Cl. ........................ 285/47; 285/96; 285/61; 285/298; 285/302
[58] Field of Search ........................... 285/47, 298, 300, 285/301, 302, 96, 61

[56] References Cited

U.S. PATENT DOCUMENTS

| 2,319,543 | 5/1943 | Hall | 285/162 |
|---|---|---|---|
| 3,600,010 | 8/1971 | Downs, III | 285/96 |
| 3,807,777 | 4/1974 | Larkin | 285/302 |
| 3,984,131 | 10/1976 | Gingrich, Jr. et al. | 285/302 |
| 4,071,266 | 1/1978 | Mountfore | 285/302 |
| 4,146,253 | 3/1979 | Celommi | 285/95 |
| 4,195,538 | 4/1980 | Brown | 285/302 |
| 4,437,688 | 3/1984 | Kramer et al. | 285/302 |
| 4,576,401 | 3/1986 | Harrison | 285/15 |
| 4,804,209 | 2/1989 | Fischer | 285/31 |
| 5,116,085 | 5/1992 | Larrel | 285/302 |
| 5,370,427 | 12/1994 | Hoelle et al. | 285/301 |
| 5,443,290 | 8/1995 | Boyer et al. | 285/95 |

FOREIGN PATENT DOCUMENTS 3597 of 1908 United Kingdom ................ 285/13

Primary Examiner—Eric K. Nicholson
Attorney, Agent, or Firm—Head, Johnson & Kachigian

[57] ABSTRACT

An inline pipeline expansion joint is provided having a first sleeve with the outer end adaptable to attach to a pipe. A second sleeve also has an outer end adaptable to attach the attachment of a pipe, the inner end of the first sleeve being co-axially and telescopically received within the second sleeve. A seal is interposed between the interior of the first sleeve and the exterior of the second sleeve. A tubular liner is positioned within the second sleeve, one end of the liner being telescopically received within the interior of the first sleeve to thereby reduce turbulence of fluid flow through the expansion joint. The first sleeve has an external annular circumferential flange with openings therethrough that receive circumferentially spaced alignment rods that are secured at one end to the second sleeve so that as the first sleeve moves telescopically with respect to the second sleeve, the two sleeves are prevented from rotating with respect to each other.

22 Claims, 3 Drawing Sheets

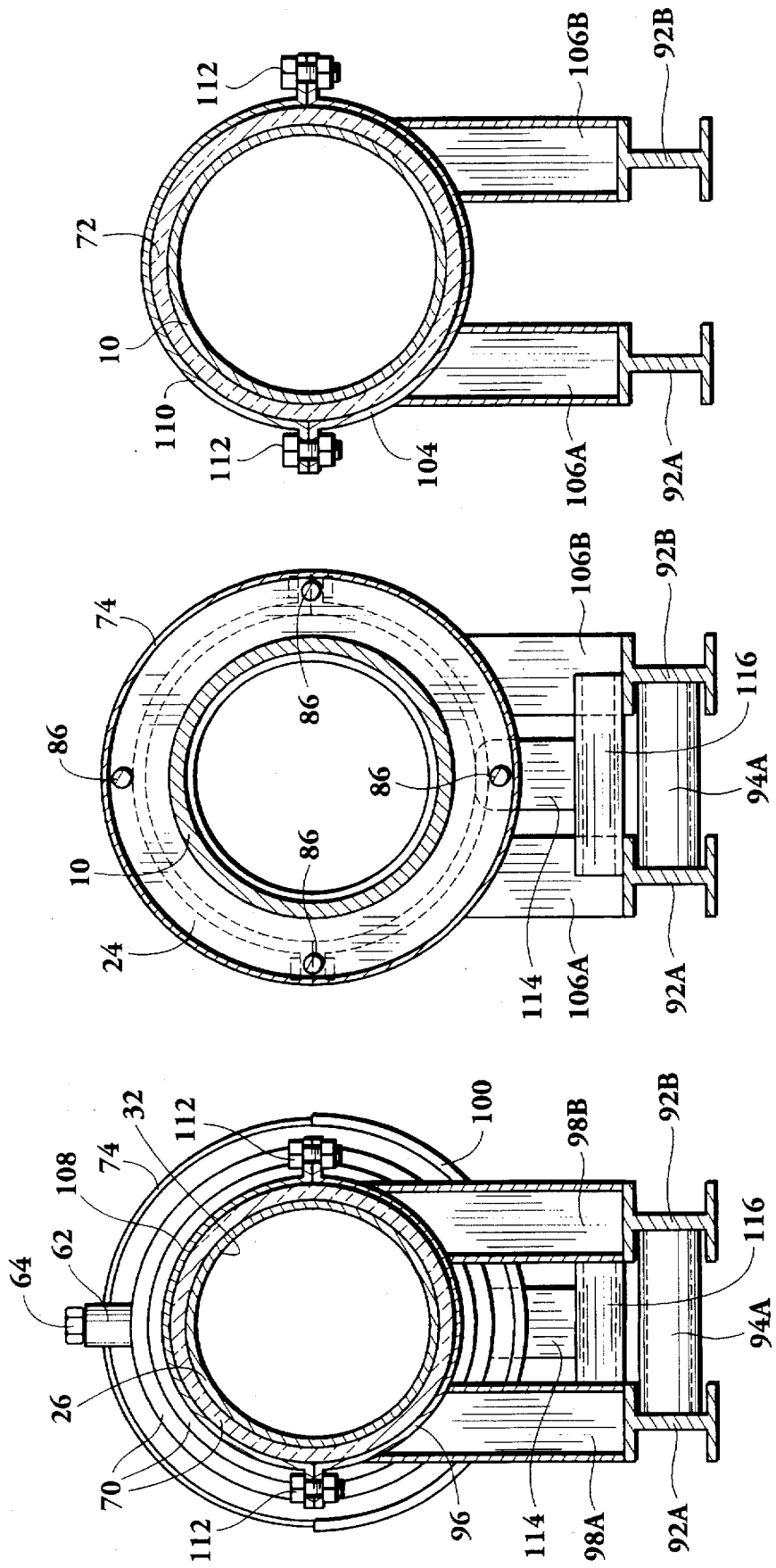

HIGH TEMPERATURE INLINE EXPANSION JOINT

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

1. Field of the Invention

This invention relates to a high temperature inline expansion joint and more particularly to an expansion joint suitable for insertion in piping that is subjected to temperature and pressure changes, the expansion joint serving to permit changes in the length of a piping system while preserving fluid containment integrity.

2. Background of the Invention

Many industrial applications require transportation of fluid, either liquid or gas, wherein either the ambient environment or the temperature of the fluid varies. Most piping systems employ metal pipe, particularly those that acquire relatively high pressure, and metal expands when heated and contracts when cooled. If the provision is not made to compensate for expansions and contractions of pipes in a piping system, the system may fail suddenly or a consequence of repeated flexing or bending.

In order to prevent damage as a consequence of the expansion and contraction of portions of piping systems, others have provided expansion joints, such as described in U.S. Pat. No. 4,146,253 entitled "Pressure Compensated Expansion Joint" issued Mar. 27, 1979. The expansion joint described and illustrated in this patent is of the general type to which the present disclosure is directed. However, the expansion joint of U.S. Pat. No. 4,146,253 includes several deficiencies. For instance, this patent does not provide for accepting insulation around the major portions of the expansion joint. Further, the expansion joint of this patent does not include a liner or the like to reduce turbulence of fluid flow through the expansion joint, nor does it include means of preventing one portion of the expansion joint from rotating relative to the other. Finally, the expansion joint as described in this patent does not include a shipping and installation module by which the joint is supported both as it is transported from the point of manufacture to a job site and while in use in a piping system.

U.S. Pat. No. 5,443,290 shows a rudimentary expansion joint that is not designed to accept high pressure such as is encountered in high temperature geothermal systems.

U.S. Pat. No. 4,804,209 entitled "Plummer's Union" shows a means of employing a sealing material that is applied in liquid or paste form, but not in a system adapted to high pressure or high temperature.

U.S. Pat. No. 4,576,401 shows a type of leak repair clamp that employs a liquid sealant but does not provide for expansion of the joint.

BRIEF SUMMARY OF THE INVENTION

This invention relates to an inline pipeline expansion system. The expansion system includes a shipping mode and an operating mode. The system includes a base that can typically be formed of structural metal components, such as, structural steel as employed in the building industry. A first saddle and a second saddle are spaced apart from each other and supported in alignment in a vertical plane by the base. A first tubular sleeve rests on the first saddle and a second tubular sleeve rests on the second saddle. Each of the tubular sleeves has means at one end for attachment to a piping system such as by welding, flanges or the like.

One end of the first sleeve is telescopically received within the second sleeve. The first and second sleeves are supported in the first and second saddles on the base in axial alignment with each other. At least one of the first and second sleeves in the operating mode is slidably supported by a saddle.

In the shipping mode, clamps are secured around the upper half of the first and second sleeves, clamping the sleeves to the saddles. In the operating mode at least one of the clamps is removed so that at least one of the sleeves is free to axially displace as a consequence of expansion or contraction of the piping system to which it is attached.

Sealing between the sleeves is important and for this purpose, packing is positioned between the sleeves. In a preferred arrangement, in addition to the use of solid packing rings, a plastic packing material is inserted into an annular area between the exterior of the inner sleeve and the interior of the outer sleeve.

Many applications require that turbulence of fluid through expansion joints be minimized. For this purpose, a tubular liner is positioned within the outer sleeve, the liner telescopically extending into the interior of the inner sleeve. The close match between the interior diameter of the liner and the interior diameter of the inner sleeve is such that turbulence of fluid flow is substantially reduced.

A common application for pipeline expansion joints is in the transportation of high temperature liquid, such as hot water produced by geothermal wells. In these or any other applications where preservation of heat energy is important, insulation is applied to the exterior of the expansion joint. While it is a common practice to employ insulation on the exterior of piping, a problem arises with an expansion joint since it moves and the normally applied insulation will open up, exposing a part of the expansion joint. To solve this problem, the present disclosure includes the provision for an insulation protector shield that provides a closed air space in an area of the expansion joint where insulation cannot be provided due to the movement of one sleeve of the expansion joint relative to the other.

One problem that has existed with other known types of expansion joints is that there is no means to prevent one sleeve from rotating relative to the other. The present invention includes means of maintaining two telescopically displaceable sleeves in both axial and radial alignment with each other.

A better understanding of the invention will be obtained from the following description of the preferred embodiments and the claims, taken in conjunction with the attached drawings.

DESCRIPTION OF THE DRAWINGS

FIG. 2 shows the inner sleeve displaced axially inwardly relative to the outer sleeve which occurs when the expansion joint accommodates the expansion in length of the piping system to which the inner sleeve is connected.

FIG. 3 is an elevational cross-sectional view taken along the line 3—3 of FIG. 1 showing the base as employed during the shipping mode, that is, where a clamp is affixed to a saddle that supports the outer sleeve.

FIG. 4 is an elevational cross-sectional view taken along the line 4—4 of the expansion joint system of FIG. 1, showing the components of the system employed for resisting axial rotation of the inner sleeve relative to the outer sleeve.

FIG. 5 is an elevational cross-sectional view taken along the line 5—5 of FIG. 1 showing more details of the base structure as it appears when the system is in the shipping mode.

DETAILED DESCRIPTION OF THE PREFERRED EMBODIMENTS

Figure 1:
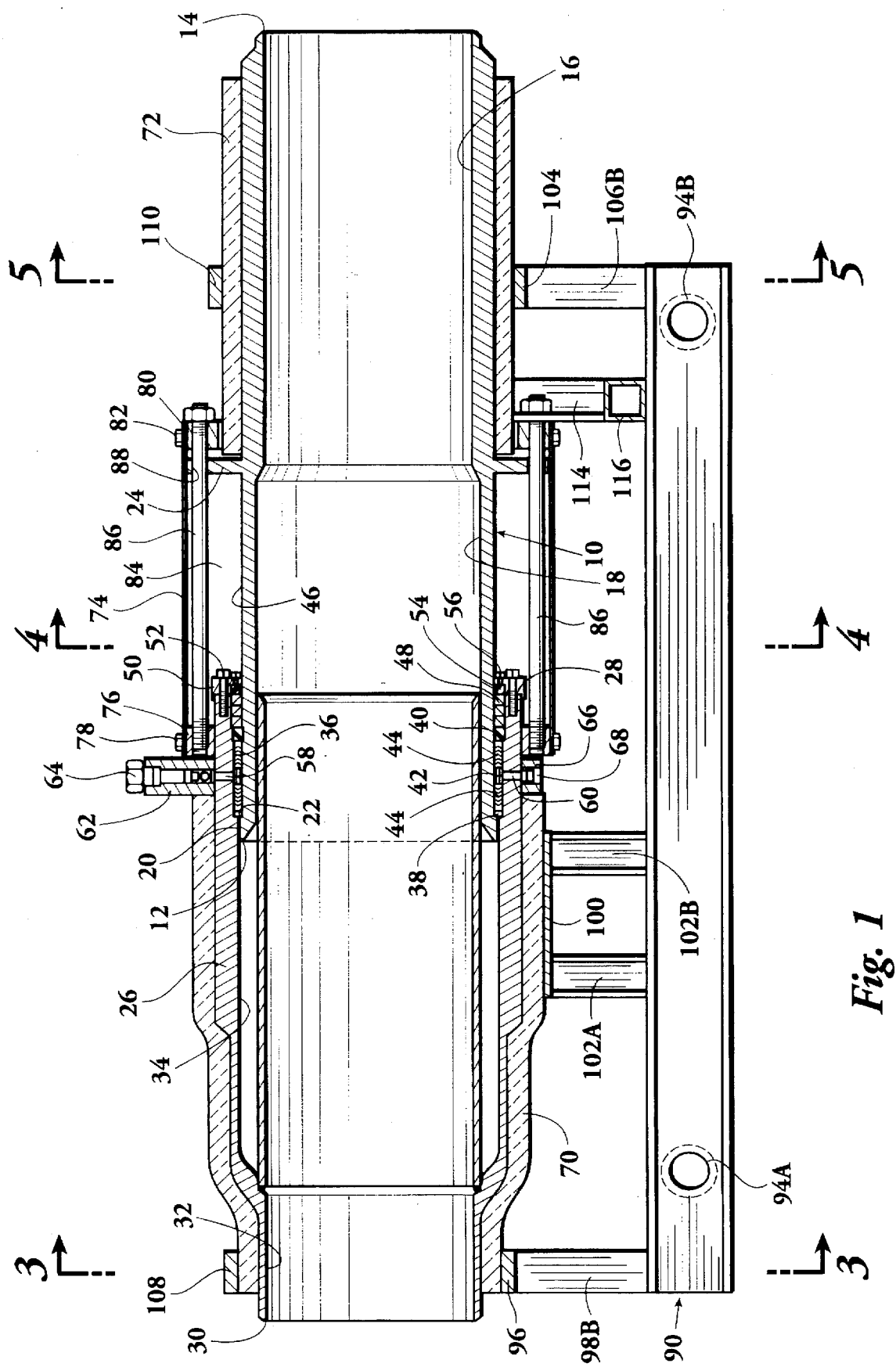
FIG. 1 is an external cross-sectional view of an inline pipe expansion system having a support structure shown in the shipping mode. Further, the expansion joint system as shown in FIG. 1 includes improved means of insulating the expansion joint, for reducing turbulence of flow through the expansion joint and for resisting rotation of one telescopic sleeve relative to the other.

Referring to the drawings and first to FIGS. 1, 3, 4 and 5, an inline pipe expansion system is illustrated. FIG. 1 shows a system in an elevational cross-sectional view, and FIGS. 3, 4 and 5 shows the system in cross-sectional views taken along the corresponding lines 3—3, 4—4 and 5—5 of FIG. 1. The system includes a first sleeve 10 which may also be termed an "inner sleeve" or a "mandrel". For consistency, element 10 will be referred to as an inner sleeve that has an inner end 12 and outer end 14. Outer end 14 is adapted to be attached to an element of a piping system. In the illustrated arrangement, outer end 14 is configured to be welded to a length of pipe, although this is by example only as outer end 14 could include a flange, a threaded end or any other means of attachment to another element in a piping system. Inner sleeve 10 has an integral portion adjacent the outer end of increased thickness, that is, having a reduced internal diameter 16 compared to the portion adjacent the inner end 12 that has a larger internal diameter 18. The external diameter of inner sleeve 10 is substantially uniform except for a short length adjacent inner end 12 having an increased external diameter 20 providing a circumferential ledge 22.

Formed on the exterior surface of inner sleeve 10, either as integrally formed with the sleeve or as welded to the sleeve, is a circumferential flange portion 24.

The second major portion of the pipeline expansion joint is a case that will be referred to as outer sleeve 26. Outer sleeve 26 has an inner end 28 and an outer end 30, outer end 30 being configured to be attached to an element in a piping system in the same way that outer end 14 of inner sleeve has been described. In the typical embodiment of the invention the diameters of outer ends 14 and 30 of inner and outer sleeves 10 and 26 respectfully will be the same so that the expansion joint can be inserted into a pipeline or other piping system without a change in fluid carrying capacity of the system.

Outer sleeve 26 has, adjacent outer end 30, a section of nominal internal diameter 32 integrally attached to a portion having an enlarged internal diameter 34. A third change in the internal diameter of outer sleeve 26 is adjacent inner end 28 wherein a portion has a slightly enlarged internal diameter 36. The tubular thickness of outer sleeve 26 varies according to structural requirements, the portion adjacent inner end 28 being of increased thickness.

Inner sleeve 10 is telescopically received within outer sleeve 26. Specifically, the increased external diameter portion 20 of inner sleeve 10 is dimensioned to closely approximate the enlarged internal diameter 34 of outer sleeve 26. This arrangement allows inner sleeve 10 and outer sleeve 26 to telescopically move in axial alignment with each other and such telescopic movement functions to provide for expansion or contraction of piping or other fluid handling equipment connected to the expansion joint.

In order to insure that no leakage occurs between inner sleeve 10 and outer sleeve 26, a packing system is provided. A first element in the packing system in the preferred arrangement includes a scraper ring 38 that is preferably made of a hard material, such as metal or hard plastic. The scraper ring 38 abuts circumferential ledge 22. Opposed to the scraper ring in the annular area between the exterior of inner sleeve 10 and the interior of outer sleeve 26 is a packing gland 40. Intermediate between scraper ring 38 and annular packing ring 40 is a lantern ring 42 that has circumferential spaces therein to receive a liquid sealant as will be described subsequently.

Positioned to either side of lantern ring 42 and between scraper ring 38 and packing gland 40 is packing 44 that, in the illustrated arrangement, is in the form of a number of circumferential packing rings having, in cross-section, a V-shaped configuration.

Also received on the external surface 46 of inner sleeve 10 are a plurality (three being illustrated) of annular secondary packing rings 48. To keep the packing rings in position, an annular packing retainer 50 is affixed to outer sleeves inner end 28 by means of bolts 52. An annular packing energizer ring 54 is positioned between packing retainer 50 and the other packing elements. By means of secondary bolts 56, packing energizer ring 54 may be depressed inwardly to squeeze secondary packing 48 against packing gland 40.

The expansion joint system includes a means of employing packing that is introduced as a liquid into the annular area between inner sleeve 10 and outer sleeve 26. A small diameter passageway 58 is formed in outer sleeve 26 spaced from the inner end 28 thereof. A similar small diameter passageway 60 is formed in outer sleeve 26 displaced 180° from first passageway 58. Communicating with passageway 58 is a tubular injection port 62 that receives a threaded bolt 64. A bleeder port 66 is secured to the exterior of outer sleeve 26 in communication with passageway 60 and is closed by bolt 68. When bolts 64 and 68 are removed, a liquid plastic sealant may be inserted through inlet port 62. The sealant flows through passageway 58 into lantern ring 42 and circumferentially around the complete exterior of inner sleeve 10 and the interior of outer sleeve 26. With bolt 68 removed, plastic sealant will flow out of passageway 60 and through bleeder port 66. Thus, bleeder port 66 is helpful in insuring that sufficient plastic sealant has been injected to flow around the entire external periphery of inner sleeve 10. After the circumferential lantern ring 42 has been filled with plastic sealant, bleeder port 66 can be closed by bolt 68 and thereafter bolt 64 can be inserted. As bolt 64 is threadably advanced it compresses the sealant to thereby further compress packing 44 to insure a leak-proof seal between the inner and outer sleeves 10 and 26.

A tubular liner 69 is secured at one end to the interior of outer sleeve 26 and extends telescopically within the interior of inner sleeve 10. The internal diameter of tubular line 69 is preferably substantially the same as the nominal diameter 32 of the outer sleeve 26 and the nominal diameter 16 of inner sleeve 10 to thereby maintain a substantially consistent internal diameter through the expansion joint.

Figure 2:
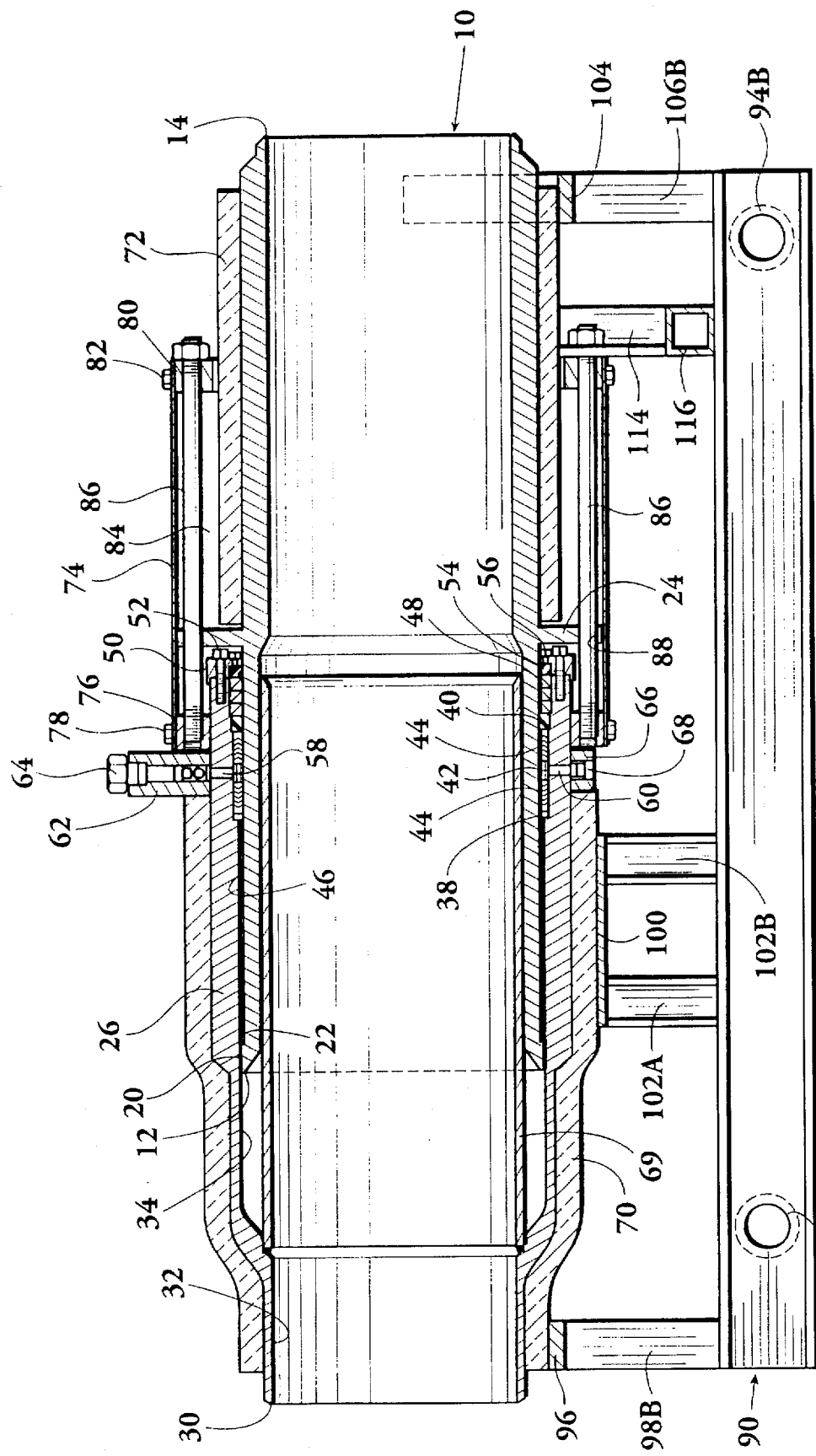
FIG. 2 is a cross-sectional view of an expansion joint as in FIG. 1 but showing the expansion joint in the operating mode. Further.

The present expansion joint is particularly useful in applications wherein hot fluids are employed, and wherein it is important to prevent loss of heat from the fluids, that is, where insulation is required. Insulation 70 applied to the exterior of outer sleeve 26 in the normal way well known in the industry. Action of the expansion joint to compensate for movement in the piping system to which it is attached does not effect insulation 70. However, a different problem arises with insulation on inner sleeve 10. The basic insulation on inner sleeve 10 is indicated by numeral 72. As shown in FIG. 2, when the inner sleeve has been telescopically displaced inwardly with respect to the outer sleeve, insulation 72 combined with insulation 70 substantially fully protects the exterior of the expansion joint. However, when the inner sleeve is telescopically retracted with respect to the outer sleeve, as shown in FIG. 1, a gap in the insulation results. To prevent the loss of heat, a thin tubular insulation protector shield 74 is employed. One of the tubular ends of shield 74 is supported to outer sleeve 26 by means of a support ring 76 which can, for example, be welded to the exterior surface of outer sleeve 26, the insulation protector shield 74 being attached to it by means of bolts 78. The outer tubular end of insulation protector shield 74 is supported by an annular support ring 80 that is held in position in a manner to be described subsequently. Insulation protector shield 74 is attached to annular support ring 80 by means of bolts 82. The insulation protector shield 74 thereby provides an air space 84 that serves as an insulator, the air space also serving to accept insulation 72 when the inner sleeve is telescopically moved internally of outer sleeve 26.

In some applications, it is advantageous to rotationally interlock the inner and outer sleeves. For this purpose, a plurality of alignment rods 86 are employed. One end of each alignment rod 86 is attached to support rings 76, the other ends extending through openings in outer support ring 80. Flange 24 has openings 88 that slidably receive rods 86.

By comparing FIGS. 1 and 2 it can be seen that as inner sleeve 10 is telescopically displaced relative to outer sleeve 26, flange 24 slides on rods 86 and thereby internal sleeve 10 is prevented from rotating relative to outer sleeve 26.

As particularly seen in FIG. 4, four alignment rods 86 are illustrated, however, this is by example only. The number of alignment rods should be at least two and preferably three or four. The use of three equally circumferentially spaced alignment rods is a preferred arrangement, the depiction of four alignment rods is for simplicity of illustration.

An important part of the invention is the provision of a pipeline expansion joint system that includes a structure providing both a shipping mode and operating mode. For effective operation and for long operating life of the expansion joint, inner sleeve 10 and outer sleeve 26 must be co-axially supported with respect to each other to prevent binding of the two components as they telescope. Further, it is highly desirable that the expansion joint system be maintained in axial alignment both during shipment as well as after installation. For this purpose, the system includes a base, generally indicated by the numeral 90, that is formed of structural metal, and in the illustrated embodiment is shown as being formed of two spaced apart I-beams 92A and 92B. The I-beams are held in spaced apart relationship to each other by a pair of cross beams that may be in the form of lengths of pipe indicated by 94A and 94B. Thus, the welded together I-beams 92A, 92B and cross beams 94A, 94B form a solid base structure to support the expansion joint during shipment and such base structure may be employed in the installation of the expansion joint.

Outer sleeve 26 is supported by a first saddle 96 which, in turn, is supported above the base by legs 98A and 98B which may be in the form of square tubing, round pipe, or other structural member. Outer sleeve 26 is further supported by a second saddle 100 secured by two pairs of legs 102A and 102B, only one of each pair being seen in FIGS. 1 and 2, such legs not being seen in the cross-sectional views.

Inner sleeve 10 is supported by a third saddle 104 seen in FIGS. 1, 2 and 5 supported by legs 106A and 106B.

To maintain inner and outer sleeves 10 and 26 in alignment during shipping, first saddle 96 and third saddle 104 are each provided with integral horizontal portions at the ends as shown in the drawings and receive clamps 108 and 110 respectively. Clamps 108 and 110 are held to their corresponding saddles by means of bolts 1 12. After the expansion joint has been installed in a piping system and is ready for operation, clamps 108 and 110 are removed so that the inner and outer sleeves are free to move on the saddles in response to temperature or pressure changes in the piping systems to which they are attached.

As previously stated, one of the features of the expansion joint of this disclosure is a means to prevent the axial rotation of the inner sleeve relative to the outer sleeve that employs alignment rods 86. To further rotationally stabilize the expansion joint a bracket 114 extends from a cross brace 116 which is, in turn, affixed to base 90. Outer support ring 80 is secured to bracket 114 by means of one of the alignment rods 86. Thus, support ring 80 is rotationally locked to the base to thereby rotationally lock flange 24 of inner sleeve 10 against rotation.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An inline pipeline expansion joint comprising:
   a first sleeve having an inner and an outer end, the outer end adaptable to receive an attachment of a fluid carrying member;
   a second sleeve having an inner end and an outer end, the outer end adaptable to receive attachment of a fluid carrying member, an inner end portion of said first sleeve being co-axially and telescopically received within said second sleeve;
   seal means interposed between said first sleeve and said second sleeve;
   a tubular insulation shield having a first end secured to said second sleeve adjacent said inner end thereof and an outer end, the insulation shield being of internal diameter greater than said first sleeve providing an annular telescopic air space surrounding a portion of said first sleeve; and
   an annular scraper affixed to said first sleeve inner end and in sliding engagement with an interior circumferential surface of said second sleeve.

2. An inline pipeline expansion joint according to claim 1 including:
   an injection port secured to said second sleeve adjacent said inner end thereof adaptable to receive the injection of a seal forming liquid.

3. An inline pipeline expansion joint according to claim 2 including spaced apart annular retention seals secured within said second sleeve adjacent said inner end thereof, the retention seals being positioned on opposite sides of said injection port and serving to confine seal forming liquid injected through said injection port.

4. An inline expansion joint according to claim 1 including means to restrict the rotation of said second sleeve relative to said first sleeve.

5. An inline expansion joint according to claim 1 including means to co-axially support said first and second sleeves relative to each other.

6. An inline expansion joint according to claim 5 wherein said means to support said first and second sleeves include a structural framework useful for assembly and shipping the expansion joint and for supporting the expansion joint in a field installation.

7. An inline expansion joint according to claim 1 including:
    a tubular liner having a first end affixed internally of and co-axially with said second sleeve, the liner having a second end telescopically received within said first sleeve.

8. An inline pipeline expansion system having a shipping mode and an operating mode, comprising:
    a base;
    a first saddle means and a second spaced apart saddle means supported in alignment by said base;
    a first tubular sleeve having means at a first end for the attachment of a fluid carrying member, the first sleeve supported by said first saddle means;
    a second tubular sleeve having means at one end for the attachment of a fluid carrying member, a second end of said first sleeve being telescopically received within said second sleeve, the second sleeve supported by said second saddle means, said first and second sleeves being supported in axial alignment, at least one of said first and second sleeves in the operating mode being slidably supported by a said saddle means; and
    means in the shipment mode of releasably securing at least one sleeve by at least one of said first and second saddle means.

9. An inline pipeline expansion system having a shipment mode and an operating mode according to claim 8 wherein at least one of said saddle means comprises separate spaced apart saddle means.

10. An inline pipeline expansion system according to claim 8 including:
    a seal means interposed between said first sleeve and said second sleeve.

11. An inline expansion joint according to claim 8 including means to restrict the rotation of said second sleeve relative to said first sleeve.

12. An inline expansion joint according to claim 8 including:
    a tubular liner having a first end affixed internally of and co-axially with said second sleeve, the liner having a second end telescopically received within said first sleeve.

13. An inline pipeline expansion joint comprising:
    a first sleeve having an inner and an outer end portion, the outer end portion adaptable to receive attachment of a fluid carrying member;
    a second sleeve having an inner and an outer end portion, the outer end portion adaptable to receive attachment of a fluid carrying member, said inner end portion of said first sleeve being co-axially and telescopically received within said second sleeve inner end portion;
    a seal interposed between said first sleeve and said second sleeve inner end portions; and
    a structural framework co-axially supporting said first and second sleeves relative to each other for assembly and shipping the inline expansion joint and for subsequently telescopically supporting said first and second sleeves in a field installation.

14. An inline expansion joint according to claim 13 including:
    a tubular liner having a first end affixed internally of and co-axially with said second sleeve inner end portion, the liner having a second end telescopically received within said first sleeve inner end portion, the liner serving to maintain a substantially uniform internal diameter through the expansion joint.

15. An inline pipeline expansion joint according to claim 13 including:
    an injection port secured to said second sleeve adjacent said inner end thereof adaptable to receive the injection of a seal forming liquid.

16. An inline pipeline expansion joint according to claim 13 including:
    an annular scraper affixed to said first sleeve inner end and in sliding engagement with an interior circumferential surface of said second sleeve.

17. An inline pipeline expansion joint according to claim 15 including spaced apart annular retention seals secured within said second sleeve adjacent said inner end thereof, the retention seals being positioned on opposite sides of said injection port and serving to confine seal forming liquid injected through said injection port.

18. An inline expansion joint according to claim 13 including means to restrict the rotation of said second sleeve relative to said first sleeve.

19. An inline expansion joint according to claim 13 including:
    a tubular insulation shield having a first end secured to said second sleeve adjacent said inner end thereof and an outer end, the insulation shield being of internal diameter greater than said first sleeve providing an annular telescopic air space surrounding a portion of said first sleeve.

20. An inline pipeline expansion joint comprising:
    a first sleeve having inner and outer end portions, the outer end portion being adaptable to receive attachment of a fluid carrying member;
    a second sleeve having inner and outer end portions, the outer end portion being adaptable to receive attachment of a fluid carrying member, the inner end portion having an enlarged internal diameter, said inner end portion of said first sleeve being co-axially, sealably and telescopically received within the second sleeve inner end portion; and
    a tubular liner having a first end affixed internally of and co-axially with said second sleeve enlarged internal diameter inner end portion, the liner having a second end telescopically received within said first sleeve inner end portion, the internal diameters of the tubular liner, the first sleeve outer end portion and the second sleeve outer end portion being substantially the same to thereby maintain a substantially consistent internal diameter through the expansion joint.

21. An inline expansion joint according to claim 20 wherein said first sleeve inner end portion has an enlarged internal diameter compared to said first sleeve outer end portion.

22. An inline expansion joint according to claim 21 wherein said enlarged internal diameter of said first sleeve inner end portion is substantially equal to the external diameter of said tubular liner.

* * * * *